United States Patent [19]

Muschelknautz et al.

[11] 3,759,578
[45] Sept. 18, 1973

[54] APPARATUS FOR CONVEYING BULK MATERIAL

[75] Inventors: Edgar Muschelknautz, Leverkusen-Bayerwerk; Wolfgang Krambrock, Leverkusen, both of Germany

[73] Assignee: Bayer Aktiengesellschaft, Leverkusen, Germany

[22] Filed: Dec. 23, 1971

[21] Appl. No.: 211,507

[30] Foreign Application Priority Data
Jan. 19, 1971  Germany.................. P 21 02 301.8

[52] U.S. Cl..................................... 302/29, 302/64
[51] Int. Cl........................................... B65g 53/04
[58] Field of Search............................ 302/64, 29, 31

[56] References Cited
UNITED STATES PATENTS
3,240,531   4/1966   Lipport et al..................... 302/64 X
3,626,986   12/1971  Amberg............................ 302/64 X FOREIGN PATENTS OR APPLICATIONS
1,151,173   5/1966   Great Britain....................... 302/64

Primary Examiner—Richard E. Aegerter
Assistant Examiner—H. S. Lane
Attorney—Ralph D. Dinklage et al.

[57] ABSTRACT

A pneumatic conveying system for bulk materials comprises a conveyor pipe and a bypass pipe which communicates with the conveyor pipe at several points through inlet and outlet openings, the free cross-section of the by-pass pipe being equal to between 10 and 20 percent of the free conveying cross-section of the conveyor pipe. The inlet and outlet openings are formed by radial cut-outs in the wall of the bypass pipe, the ducts of the pipe wall immediately following these cut-outs being in the form of tongues which block from 10 to 90 percent of the free cross-section of the bypass pipe.

7 Claims, 2 Drawing Figures

PATENTED SEP 18 1973 3,759,578
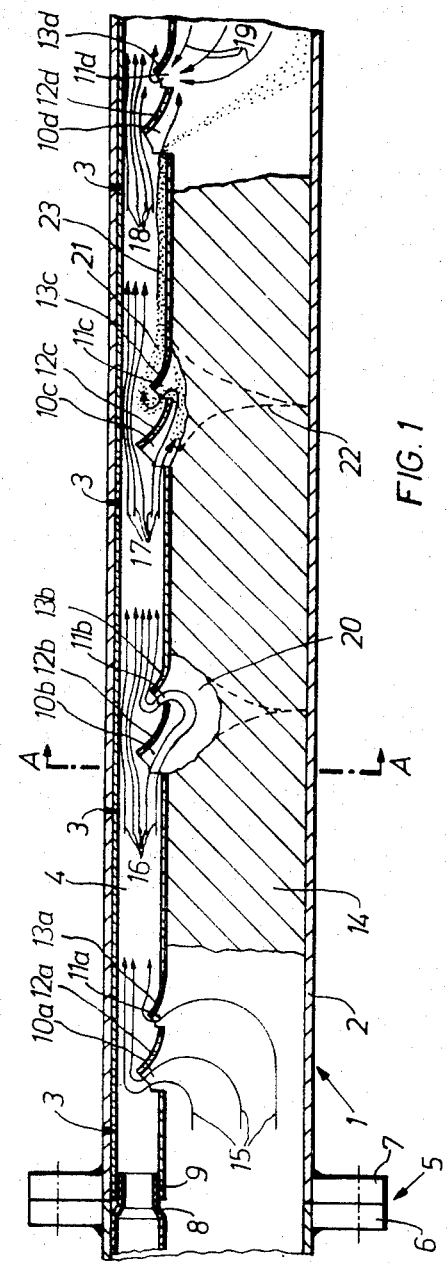
FIG. 1
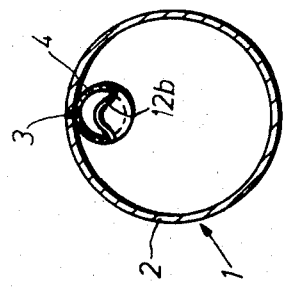
FIG. 2 A-A

APPARATUS FOR CONVEYING BULK MATERIAL

This invention relates to an apparatus for pneumatic or hydraulic conveying of bulk material in dust, powder or granular form.

In one known process (German Patent Specification 1,174,256), material in dust, powder or granular form can be conveyed free from any danger of blocking using a quantity and a flow-rate for the carrier medium of only a fraction of the hitherto usual values. In this process the main stream forming the mixture of product and carrier medium in the pipeline is partly branched off at a number of junctions following one another at short intervals longitudinally of the flow direction and the component stream flows through the particular branch separately from the main stream and is guided back into the main stream just upstream of the next junction.

This process was carried out in an apparatus comprising a conveyor pipe with branch pipes running parallel thereto which, at both ends, open into the conveyor pipe, a number of short branch pipes being arranged one behind the other longitudinally of the main pipeline with the outlet opening of each branch pipe opening just upstream of the inlet opening of the next branch pipe. In this case, the branch pipes are preferably arranged inside the conveyor pipe, or alternatively they are formed from a pipe arranged inside the conveyor pipe which is bent at intervals and which is cut at the bends to form branch openings.

In order to convey bulk materials safely by pneumatic or hydraulic means, the resistance which is built up as the carrier medium flows through the branch pipe must be considerably greater than the flow resistance which is directed against the main stream in the conveyor pipe, otherwise most or all of the flow medium would flow through the branch pipe without taking part in the conveying operation. The minimum pressure difference between the static pressures in front of and behind a plug of material of the kind frequently formed in pneumatic conveying which is necessary for the further movement thereof, increases progressively with increasing plug length due to the wedging effect of the particles of material both against one another and against the wall. In the case of an excessively long plug of material, the conveying pressure available is no longer sufficient to apply the pressure difference required to shift the plug. In this case, the carrier medium flows in surges into and through the branch pipe through the inlet opening situated upstream of the plug. The static pressure of the unblocked conveyor pipe lying upstream of the plug, reduced by the particular flow resistance of the branch pipe section, is applied to the plug of material through the outlet and inlet openings in the branch pipe which it has closed. Although the static pressure upstream of the plug of material is unable to shift the entire plug of material, the pressure is sufficient for separating the last plug fragment (looking in the direction of flow) which at most extends over a length corresponding to the interval between two outlet openings in the branch pipe, providing the flow resistance of the branch pipe carrying the last plug fragment is greater than the resistance required to shift the plug fragment. Once the last fragment of the plug of material has been broken up and carried away, the separation process is repeated with each preceding fragment of the plug until the process is completed.

German Patent Specification 1,174,256 discloses various embodiments of the branch pipes some of which are arranged outside and some inside the conveyor pipe. In this case, the necessary flow resistance of the branch pipe between two branch openings which arises out of the pressure required to shift a plug of material situated between these two openings, is generated by a vary narrow cross-section of the branch pipe.

Safe pneumatic or hydraulic conveying at low rates of flow of the carrier medium is only ensured if the relatively narrow branch pipes remain free from deposits of material. However, this is only the case with non-sticking, free-flowing fine-grained bulk materials. In the case of bulk materials which form a light wall deposit or whose grain size range covers particles a few mm in diameter, the narrow branch pipes soon become blocked and hence ineffective.

Swiss Patent Specification 459,060 discloses branch pipes of relatively large cross-section which are formed by welding a U-shaped bypass duct on to the conveyor pipe, or by inserting and screwing a plate into the conveyor pipe by which a circular segment of the pipe is separated off. Inside the U-shaped bypass duct, branch openings are drilled through the wall of the conveyor pipe. In the segment-like bypass duct, the branch openings are in the form of holes drilled into the inserted strip of metal. The requisite minimum pressure loss in the bypass duct is obtained by incorporating chicanes between two branch openings.

These particular embodiments of the bypass duct provide for extremely safe conveying at low conveying pressures and with a low throughput of carrier medium. A light wall deposit and even relatively large particles of material which enter the bypass duct do not give rise to any disturbances.

Unfortunately, the costs involves in making the conveyor pipes with the bypass duct welded on to them or formed by inserting the strip of metal, are so high that, especially in conveyor systems with low or average throughputs of material, the increased costs cannot be covered by the saving of energy by comparison with a conventionally built conveyor system. One particular disadvantage of the segment-like bypass duct is that a considerable proportion of the conveyor pipe cross-section is occupied by the bypass duct. In addition, it is extremely difficult to fix the edges of the inserted strip tightly to the wall of the pipe.

An object of the invention is to provide an operationally safe embodiment of a conveyor pipe with a bypass duct which is easy and inexpensive to produce.

According to the invention, there is provided an apparatus for pneumatic or hydraulic conveying of bulk materials comprising a conveyor pipeline with branch pipes parallel thereto which at both ends open into the conveyor pipe, a number of short branch pipes being arranged one behind the other longitudinally of the pipeline whilst the outlet opening of each branch pipe opens upstream of an inlet opening the adjacent branch pipe on the downstream side thereof, wherein the branch pipes consist of a bypass pipe which is fixed inside the conveyor pipe to the wall thereof and whose free cross-section is from 10 to 20 percent of the free cross-section of the conveyor pipe and in which the inlet openings and outlet openings are formed by radial cut-outs in the wall of the bypass pipe, the ends of the pipe wall immediately downstream of the openings projecting as tongues into the bypass pipe against the main conveying direction and blocking from 10 to 90 percent of the free cross-section of the bypass pipe.

Thus, for example, in the bypass pipe, the inlet openings are preferably each provided (looking in the conveying direction) behind an outlet opening at a distance corresponding to between one and two times the internal diameter of the bypass pipe.

The tongues of the outlet openings advantageously block from 30 to 90 percent of the free cross-section of the bypass pipe.

It has proved to be similarly advantageous for the tongues of the inlet openings to block from 10 to 70 percent of the free cross-section of the bypass pipe.

All these special measures contribute towards the build up in the bypass pipe of pressure conditions particularly favourable for conveying and for substantially avoiding deposits of material in the bypass pipe. The conditions most suitable for a given material can be determined by tests.

By virtue of the bypass pipe designed in accordance with the invention, the carrier medium is able, in the event of a relatively long plug of material being formed in the conveyor pipe, to penetrate into the bypass pipe through the branch openings upstream of the plug. By virtue of the relatively large cross-section of the bypass pipe, there is no danger of the bypass pipe becoming blocked. Material conveyed through the bypass pipe is predominantly carried forward in the form of strands along the bottom thereof. Under the effect of the tongue of the following outlet opening which is pressed into the bypass pipe, these strands of material are "peeled off" and guided back into the conveyor pipe. By contrast, the carrier medium conveys material in the form of a drifting cloud and is able to flow almost unhindered along the bypass pipe through the unblocked cross-section thereof. One particular advantage of this is that the material conveyed through the bypass pipe does not have to pass any constrictions so that there is no danger of blockage.

Conventional types of bypass pipe have a constant pressure loss coefficient, as measured between two outlet openings, which is unaffected by the flow rate or delivery rate. By contrast, the pressure loss coefficient of the individual bypass pipe sections in the apparatus according to the invention is automatically adapted to the particular delivery phase. Where the material is uniformly conveyed, the rate of flow in the bypass pipe is much lower than in the conveyor pipe due to the relatively high pressure loss coefficient. It is only when a plug of material is formed that the carrier medium flows in surges into the bypass pipe through the inlet and outlet openings upstream of the plug of material. The static pressure prevailing upstream of the plug of material, acts on the plug of material through the following outlet opening in the bypass pipe which is closed by the plug of material.

If the plug is short, that fragment following the outlet opening in the direction of flow is carried off. By contrast, if the plug extends over several sections of the bypass pipe, the carrier medium is able to continue flowing through the bypass pipe above the tongues of the outlet and inlet openings projecting into the bypass pipe. The tongue of the outlet opening directed against the flow direction in the bypass pipe produces considerable constriction of the flow in the following section of the bypass pipe. As in an injector, a sharp propellant jet is formed. The effect of the reduced pressure which it produces in the area surrounding it is that a little material is sucked out of the plug of material into the bypass pipe through the inlet openings downstream of the outlet openings. By virtue of the fact that the material sucked in has to be accelerated in the conveying direction, the pressure loss coefficient of the following bypass pipe section is increased. The plug of material is as it were hollowed out through the removal of material from it under suction. As a result, part of the carrier medium is able to flow out of the bypass pipe through the outlet opening and back in through the inlet opening. In this way, even more material is, so to speak, worn away and the bullow or depression in the plug of material becomes larger, making it easier for the next plug fragment downstream thereof to be broken away. If the static pressure is not sufficient for this purpose, the delivery of material from the plug into the bypass pipe soon comes to a stop because the cross-section of the area hollowed out in the plug of material is too large and hence the rate of flow therein too low to entrain further particles of material. The pressure loss coefficient of the outlet opening falls again and the carrier medium is able to flow almost unhindered to the next outlet opening where the sequence of events described above is repeated.

Once the final plug fragment (looking in the direction of flow) has been broken away, the pressure loss in the bypass pipe is reduced by an amount corresponding to the flow resistance of that section of the bypass pipe previously surrounded by the plug. As a result, an increased quantity of carrier medium now flows through the bypass pipe with the effect that material from the channels which have already been hollowed out below the inlet openings is sucked through the inlet opening into that section of the bypass pipe upstream of the end of the plug.

In this way, the pressure loss in the bypass pipe sections is increased again, thus preventing the carrier medium from flowing unhindered around the rest of the plug through the bypass pipe.

The bypass pipe used in the invention is distinguished from conventional embodiments by its high reliability in operation, and by the fact that the costs involved in making the conveyor pipe integrally with the bypass pipe can be reduced in this way to as little as one quarter so that the use of the conventional process for separating columns of material in the pneumatic or hydraulic conveying of bulk materials is now economically justified in almost every case.

The invention is described in detail in the following with reference to an embodiment illustrated purely diagrammatically in the accompanying drawings, wherein:

FIG. 1 is a longitudinal section through the apparatus according to the invention, and FIG. 2 a cross-section on the line A—A of FIG. 1.

In FIGS. 1 and 2, the apparatus consists of a conveyor pipeline 1 which is divided into a conveyor pipe 2 and a bypass pipe 4 arranged therein and locally welded thereto at the highest point 3. The free cross-sections of the conveyor pipe 2 and the bypass pipe 4 are in a ratio of approximately 10 to 1 to one another. The conveyor pipeline 1 comprises a connection 5 at which the conveyor pipe 2 is joined with flanges 6, 7, whilst the bypass pipe 4 comprises a socket joint 8, 9. The bypass pipe 4 is provided with openings 10a, 10b, 10c, 10d and 11a, 11b, 11c, 11d. The openings 10a, 10b, 10c, 10d act as "outlet openings" because the carrier medium generally flows out of the bypass pipe 4 through them into the conveyor pipe 2, whilst the openings 11a, 11b, 11c, 11d are "inlet openings" because the carrier medium enters the bypass pipe 4 through them from the conveyor pipe 2.

The ends of the pipe wall downstream thereof project as pressed-in tongues 12a, 12b, 12c and 12d into the free cross-section of the bypass pipe and block approximately 50 percent thereof, the upwardly projecting ends of the tongues 12a to 12d being directed against the main conveying direction. The pressed-in tongues 13a, 13b, 13c and 13d of the inlet openings 11a to 11d are similarly formed, except that they only block 30 percent of the free cross-section of the bypass pipe 4.

If a relatively long plug 14 of material is formed in the conveyor pipe 2, the carrier medium flows exceptionally through the outlet opening 10a and the inlet opening 11a into and through the bypass pipe 4. The arrows 15, 16, 17, 18 and 19 represent the streams of carrier medium at the individual inlet and outlet openings 10a to 10d and 11a to 11d. Below the outlet opening 10b, some of the material has already been worn away from the plug 14. The cross-section of the channel 20 thus formed is even at this stage so great that the rate of flow of the carrier medium in the channel 20 is no longer sufficient to entrain further material. As indicated by the arrows 16, the carrier medium now flows partly through the upper section of the bypass pipe 4 and partly from the outlet opening 10b through the channel 20. The carrier medium then reenters the bypass pipe 4 through the inlet opening 11b. By distributing the flow of carrier medium over a relatively large cross-sectional area in this way, the flow resistance generated by the tongues 12b and 13b in the bypass pipe is reduced.

By contrast, if the plug 14 of material is still blocking the opening 10c, the carrier medium is accelerated to a relatively high rate of flow at the outlet opening 10c where it flows round the tongue 12c on account of the reduction in cross-section of the bypass pipe 4. The device thus functions in the manner of an injector, the material 21 being sucked through the inlet opening 11c into the bypass pipe 4 in which it is also greatly accelerated. As a result, pipe 4 is increased. The increase in the pressure loss has the same effect as partial closure of this section of the bypass pipe 4. The material carried through the bypass pipe 4, predominantly in the form of strands 23, is peeled off by the tongue 12d of the outlet opening 10d and guided back into the conveyor pipe 2.

The static pressure prevailing upstream of the plug 14, which is only reduced by an amount corresponding to the relatively low flow resistance of the outlet opening 10a and inlet opening 11a, now acts through the bypass pipe 4 and the outlet opening 10c on the plug fragment situated between the branch openings 10c and 10d in the direction of flow. Under the effect of this pressure which on its own would not be sufficient to shift the entire plug 14 of material, the final plug fragment is broken away along the chain line 22.

The arrows 18 indicate the flow pattern at the outlet opening 10d nearest the end of the plug. After the fragment of plug between the outlet openings 10c and 10d has been broken away, almost the entire carrier medium flows out of the opening 10c into the conveyor pipe 2. The pressure loss of the bypass pipe 4 is reduced by an amount corresponding to the flow resistance of that section of the bypass pipe situated above the separated plug 14. The reduction in the pressure loss is accompanied by an increase in the flow of carrier medium through the bypass pipe 4. As a result, the rate of flow of the carrier medium in the bypass pipe 4 and in the channel 20 is increased. Once again material is sucked through the inlet opening 11b into the bypass pipe 4 and separation of the plug fragment furthest downstream takes place in the same way as described with reference to the pipe section between the openings 10c and 10d. This sequence of operations is then repeated against the direction of flow.

What we claim is:

1. An apparatus for pneumatic or hydraulic conveying of bulk materials comprising a conveyor pipeline and a by-pass pipe disposed longitudinally within the conveyor pipe, the by-pass pipe having a free cross-sectional area of from 10 to 20 percent of the free cross-sectional area of the conveyor pipe, inlet openings and outlet openings at spaced intervals along the length of the pipe formed by radial cut-outs in the inwardly disposed side of the wall of the by-pass pipe communicating the by-pass pipe with the conveyor pipe, the end of the by-pass pipe wall immediately downstream of each cut being bent inwardly and projecting as a tongue into the by-pass pipe against the main conveying direction and blocking from 10 to 90 percent of the free cross-section of the by-pass pipe.

2. An apparatus as claimed in claim 1, wherein the inlet openings in the by-pass pipe are each located downstream of an outlet opening at a distance corresponding to between one and two times the internal diameter of the by-pass pipe.

3. An apparatus as claimed in claim 2 wherein the tongues of the outlet openings block from 30 to 90 percent of the free cross-section of the by-pass pipe.

4. An apparatus as claimed in claim 3, wherein the tongues of the inlet openings block from 10 to 70 percent of the free cross-section of the by-pass pipe.

5. An apparatus as claimed in claim 2 wherein the tongues of the inlet openings block from 10 to 70 percent of the free cross-section of the by-pass pipe.

6. An apparatus as claimed in claim 1 wherein the tongues of the outlet openings block from 30 to 90 percent of the free cross-section of the by-pass pipe.

7. An apparatus as claimed in claim 1 wherein the tongues of the inlet openings block from 10 to 70 percent of the free cross-section of the by-pass pipe.

* * * * *